S. S. WELDON.
Creamer.
No. 225,672. Patented Mar. 16, 1880.
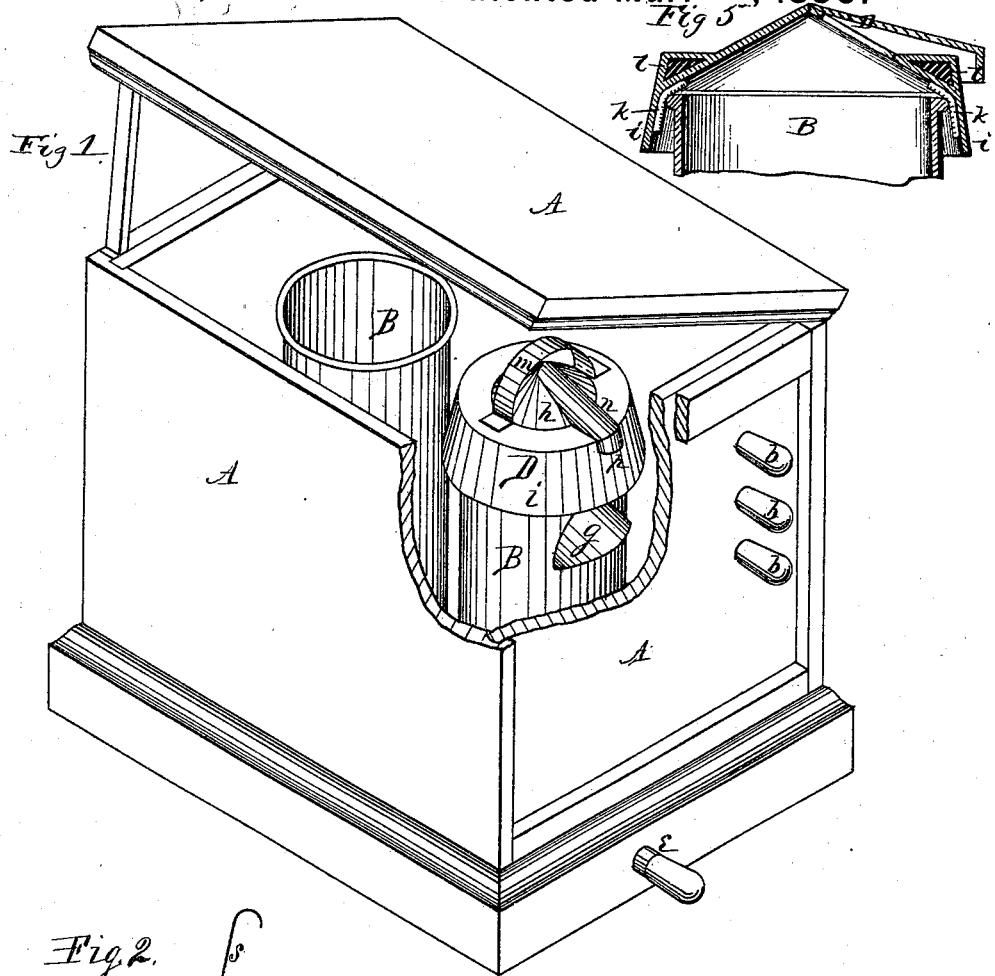
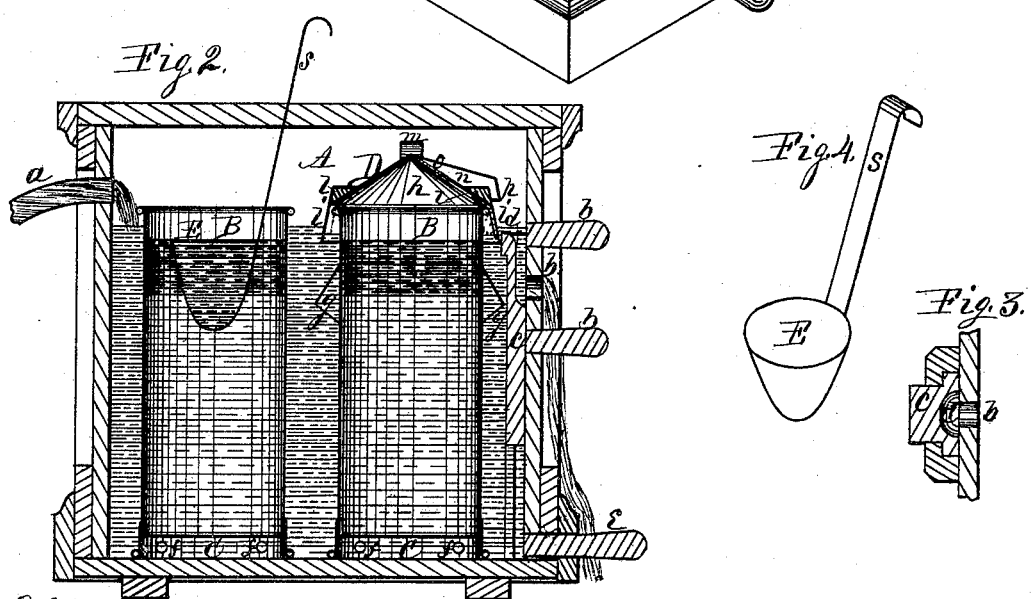
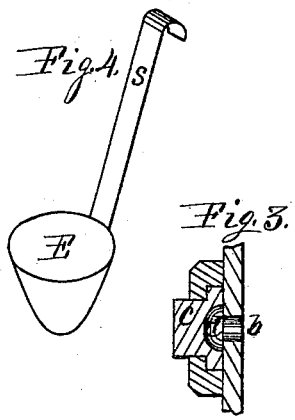

UNITED STATES PATENT OFFICE.

SPENCER S. WELDON, OF ROCKFORD, ILLINOIS.

CREAMER.

SPECIFICATION forming part of Letters Patent No. 225,672, dated March 16, 1880.

Application filed July 8, 1879.

*To all whom it may concern:*

Be it known that I, SPENCER S. WELDON, of Rockford, in the county of Winnebago and State of Illinois, have invented a new and useful Improvement in Creamers, of which the following is a specification.

This invention relates to that class of creamers in which cans are used to set the milk to raise the cream, and is an improvement on my former patent, dated December 10, 1878.

In the process of raising cream or milk set in hermetically-sealed submerged cans it is found that the gases arising therefrom, commonly termed "the animal odors," condense on the cover, from which they drop into the cream and are absorbed, which process effectually retains the offensive and injurious odors of the milk in the cream from which the butter is to be made, and that butter made from cream raised in this manner becomes rancid in much less time than butter made of cream from which the gases were permitted to escape in the process of cooling.

To obviate this objectionable feature and produce a creamer in which the cans employed to set the milk to raise the cream are practically protected from the action of the atmosphere and insects, and in other respects to improve upon my former patent, is the object of the invention hereinafter described.

In the accompanying drawings, Figure 1 is an isometrical representation of my improved creamer, in which a portion of the tank is broken away to show the cans placed therein. Fig. 2 is a lengthwise vertical section cut on a zigzag line which passes centrally through the inlet and outlets of the tank and through the vertical centers of the cans placed therein. Fig. 3 is a horizontal cross-section of the outlet or water-waste fixtures. Fig. 4 represents a skimmer of parabolic form. Fig. 5 is a detail sectional view of the can-cover.

In the figures, A represents a tank, of rectangular chest form, made from plank or other suitable material, and of proper depth to receive the milk-cans, and in length and width may be made to contain any reasonable number of cans that may be found convenient or adapted to meet the requirements of the user. This tank is designed to contain water, into which the cans containing the milk are placed, and it is provided with an induction-pipe, $a$, through which water may be permitted to flow into the tank. It is also provided with a series of outlet-openings fitted with removable plugs $b$, by means of which the depth of the water in the tank may be regulated, which is accomplished by removing a higher or lower plug. Instead of the plugs, however, stop-cocks or faucets may be employed. It is also fitted with an overflow-gate, $c$, fitted to slide up and down over the plug-openings in grooved ways on the inside of the tank. The upper portion of this overflow-gate is provided on its outside with a semicircular groove, $d$, to permit the water flowing over its upper end to descend thereon between it and the tank, to be discharged through the opening when the plug is removed.

By means of this arrangement of the grooved slide and the plugged openings the water flowing into the tank may be regulated to stand at any height within the range of these devices; and when the tank is employed in situations not supplied with running water, but designed to be filled at intervals, the plugs can then be inserted to prevent the escape or leakage of water.

At $e$ is represented a discharge or outlet opening fitted with a removable plug, which, when removed, will permit the contents of the tank to be discharged; but instead of the plug-stopper a stop-cock or faucet may be employed.

B represents the milk-cans, which, in this instance, are made from plate-tin, cylindrical in form, deeper than wide, with upper end open, and are fitted with a foot-rim, C, perforated as at $f$, to permit the water to circulate under the cans, and are fitted with handles $g$, employed for convenience in handling. These open-end cans are fitted with a removable cup-like lid, D, having its cover portion $h$ made in conic form, and of such size that its depending cup-like walls $i$, joined thereto, shall freely receive the upper open ends of the cans, and the inner angle of this lid, formed by the junction of the conic cover portion with the cup-like walls, is provided at proper intervals with angle-brackets $k$ or other suitable appliance to come in contact with the upper-end edges of the can, to support the lid thereon in an elevated position to form a space between the lid and the can except at the point of contact of the brackets with the cans. These cup-like conic-formed lids are weighted by means of a metallic ring, *l*, placed on the outer upper surface of the conic cover, incased with tin-plate, producing a lid having sufficient weight within itself to resist the lifting action of water and to assist in holding the can in the water, and are provided with handle *m*, employed for convenience in handling. These lids are provided with a ventilating-tube, *n*, in this instance consisting of a semicircular trough-like piece fixed to the upper surface of the lid, extending from the apex of the cover over its outer edge, and down the cup-like walls to about the level of the upper surface of the can when the lid is in place thereon. The upper end of this tube communicates internally with the conic-formed lid at or near its apex by means of the opening *o* through its outer wall, and it opens externally downward over the outer edge of the lid, as at *p*, which opening is on a lower plane than its opening into the conic cover. These lids may be produced in two main sections, consisting of the depending walls *i*, having a horizontal portion with a central opening therein, and a conic portion, *h*, of proper size and conic form to engage each other in the manner shown, both of which may be readily produced from plate material in the same manner that other like articles known as "pressed" or "struck-up" work are produced. These lids may be weighted or loaded by means of metallic rings, (shown in section at *l*,) placed between the plate parts, the adjoining parts of which may then be fixed to each other by the usual method of soldering. These parts, with the ventilating-tube, handle, and brackets, as above described, fixed in place by solder or otherwise, complete the lid. These lids may, however, be made from any suitable material, such as iron or earthenware manufactured by any of the known processes.

In the use of my improved creamer the milk is strained into the cans and the lids are placed thereon. The cans are then placed in the tank or chest, which, if not filled, is then filled with water to rise on the depending walls of the lid, which practically protects the cans against the action of the atmosphere, which will not ascend the inclined downward opening-tube to displace the gases arising from the milk, and its construction practically excludes the light, rendering the passage through it dark, which operates to prevent insects from ascending it to enter the cans, and still permits the gases arising from the milk in the process of cooling to escape; but a large portion of the gases, however, will condense on the under side of the conic-formed under surface of the lid and descend its inclined conic surface and flow over the edge of the can into the water. By this double process of the escape and condensation of the gases, and at the same time excluding the air, I am enabled to rid the milk of the foul and injurious odors arising from the milk in the process of cooling, all of which are usually retained in the cream by most other processes now in use with which I am acquainted.

My improved lid is applicable to other formed vessels than the cans herein described, and may be used for other purposes than cream-raising.

E represents a skimmer produced from tin-plate, and is of parabolic form, the apex of which is downward, the handle rising from the open end thereof, and is represented at *s*. This skimmer is designed to lift the cream from the cans with the least possible disturbance of the milk, which is accomplished by removing the lid from the cans and inserting the skimmer, point foremost, through the cream until the cream flows over its edges into the skimmer, as seen in Fig. 2, which, when filled, is carefully removed and the cream emptied into a proper receptacle. This process is repeated until all the cream is removed from the can, after which the can may be emptied of its remaining contents. This process enables me to remove the cream without disturbing the sediment or settlings of the milk.

I am aware that the milk-receptacles of cream-raising apparatus have been provided with lids with flat under surfaces, having depending outer flanges, which are submerged in water when the lid is in use, and that lids of such construction have been secured to the upper ends of milk-receptacles in such a manner that free open spaces will be formed between the lid and top of the milk-receptacle to allow of the escape of gases arising from the milk over the milk-receptacle and into the water surrounding the same. Hence I make no broad claim to a lid of such construction, as, in fact, I could not, as my improvement in lids is radically different in essential features of construction and in its operation.

In my improvement the lid is constructed of conic form on its under surface, and is raised above the top of the milk-receptacle, not for the purpose of allowing of the escape of gases, but to allow the water of condensation which forms on the conic surface of the lid, by reason of the direct contact of the gases arising from the milk coming in direct contact with the under surface of the lid, to flow downwardly and outwardly and drop into the water in which the milk-can is submerged.

My improved cover is provided with an independent exit for the escape of any confined gases, the exit being located above the surface of the water surrounding the milk-can.

I claim as my invention—

1. In a cream-raising apparatus, the combination, with a submerged milk-receptacle, of a lid having a depending flange and provided with an inclined ventilating-tube, which latter has its outlet-opening in a lower plane than its opening which communicates with the interior of the lid, substantially as set forth.

2. The herein-described conic-formed ventilated water-sealing lid, having sufficient weight within itself to resist the lifting action of the water when in place on the can in the tank, substantially as hereinbefore set forth.

SPENCER S. WELDON.

Witnesses:
JACOB BEHEL,
A. O. BEHEL.